(12) United States Patent
Nelson et al.

(10) Patent No.: US 7,987,035 B2
(45) Date of Patent: Jul. 26, 2011

(54) METHOD OF OPERATING A VEHICLE AND APPARATUS COMPRISING THE SAME

(75) Inventors: Donald P. Nelson, Nevada, IA (US); Jeremy E. Nack, New Hope, MN (US)

(73) Assignee: Sauer-Danfoss Inc., Ames, IA (US)

( * ) Notice: Subject to any disclaimer, the term of this patent is extended or adjusted under 35 U.S.C. 154(b) by 1226 days.

(21) Appl. No.: 11/426,664

(22) Filed: Jun. 27, 2006

(65) Prior Publication Data

US 2007/0299564 A1 Dec. 27, 2007

(51) Int. Cl.
*G06F 19/00* (2006.01)
*F16H 61/04* (2006.01)

(52) U.S. Cl. ............... 701/54; 701/84; 701/87; 701/93; 477/107

(58) Field of Classification Search ............... 60/420, 60/327; 475/72, 76; 180/306, 307; 477/110, 477/115, 175, 107, 108, 143, 156; 701/1, 701/48, 93, 54, 84, 87, 95, 51, 53
See application file for complete search history.

(56) References Cited

U.S. PATENT DOCUMENTS

| | | | |
|---|---|---|---|
| 3,890,360 A | 6/1975 | Pruvot et al. | |
| 4,102,131 A | 7/1978 | Reynolds et al. | |
| 4,281,567 A | 8/1981 | Maurer | |
| 4,291,594 A | 9/1981 | Baudoin | |
| 4,397,379 A | 8/1983 | Baudoin | |
| 4,966,117 A | 10/1990 | Kawamura | |
| 5,007,382 A | 4/1991 | Kawamura | |
| 5,113,829 A | 5/1992 | Motoyama | |
| 5,337,629 A * | 8/1994 | Kita | 477/52 |
| 5,560,203 A * | 10/1996 | Pollman | 60/327 |
| 5,624,339 A * | 4/1997 | Coutant et al. | 475/72 |
| 5,709,628 A * | 1/1998 | Pidde et al. | 475/75 |
| 6,020,651 A | 2/2000 | Nakamura et al. | |
| 6,292,741 B1 * | 9/2001 | Bitzer et al. | 701/115 |
| 6,336,518 B1 * | 1/2002 | Matsuyama | 180/306 |
| 6,364,811 B1 * | 4/2002 | Hubbard et al. | 477/143 |
| 6,434,466 B1 | 8/2002 | Robichaux et al. | |
| 6,895,754 B2 | 5/2005 | Hara | |
| 6,928,361 B2 | 8/2005 | Nakayama et al. | |
| 7,115,067 B2 * | 10/2006 | Tashiro | 477/83 |
| 7,195,580 B2 * | 3/2007 | Funato et al. | 477/110 |
| 2004/0034460 A1 * | 2/2004 | Folkerts et al. | 701/54 |
| 2004/0048718 A1 * | 3/2004 | Tashiro | 477/175 |
| 2004/0083044 A1 * | 4/2004 | Akiyama et al. | 701/48 |
| 2004/0215385 A1 * | 10/2004 | Aizawa et al. | 701/93 |
| 2005/0027404 A1 * | 2/2005 | Ban et al. | 701/1 |
| 2006/0020383 A1 | 1/2006 | Betz et al. | |
| 2006/0027413 A1 | 2/2006 | Tabata et al. | |
| 2006/0111826 A1 * | 5/2006 | Akiyama | 701/48 |
| 2006/0281601 A1 * | 12/2006 | Iida | 477/115 |

* cited by examiner

*Primary Examiner* — Ronnie Mancho

(57) ABSTRACT

An engine management system and a method of operating the same within a vehicle. The system uses a plurality of software modules one of which communicates with the vehicle engine to communicate information and additionally communicates with at least one other software module that provides information regarding auxiliary device operations and parameters such that the first software module produces an input torque curve signal for the vehicle engine. Additionally, secondary software modules are able to provide reduced power requirements signals to a plurality of auxiliary devices in order to ensure optimum fuel economy and noise reduction.

18 Claims, 1 Drawing Sheet

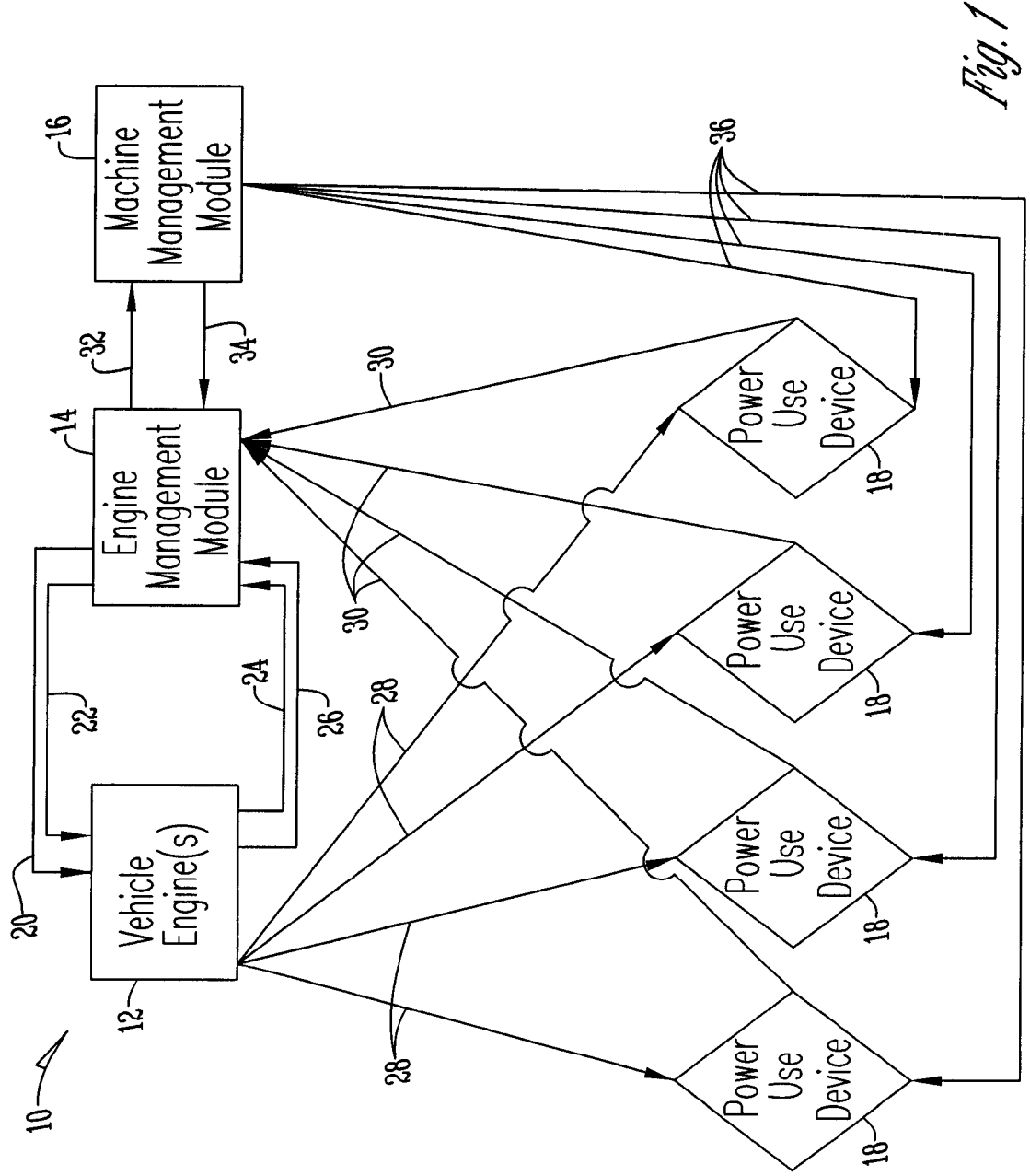

US 7,987,035 B2

METHOD OF OPERATING A VEHICLE AND APPARATUS COMPRISING THE SAME

BACKGROUND OF THE INVENTION

The invention relates to a method of operating a vehicle. More specifically, the invention relates to the use of multiple software modules in order to provide optimum driving conditions in regards to fuel consumption and noise for a vehicle.

Known in the art is the use of software modules or ECUs (electrical control units) in order to control torque input to an engine. Specifically, multiple software modules or ECUs are used wherein the engine has its own separate ECU that communicates with an auxiliary ECU that controls an auxiliary function or device in the vehicle. By passing information between the engine ECU and auxiliary machine ECU operating conditions and torque curves sent to the engine are improved in order to provide an engine output.

Despite these improvements, problems in the art still remain. Specifically, most vehicles have multiple auxiliary devices that need power from the engine, each having a different priority and importance regarding the operation of the vehicle. Similarly, at different times different auxiliary devices require different amounts of power input from the vehicle engine. Because of these problems power is often wasted within vehicles thus reducing fuel efficiency within an engine. Additionally, other considerations such the noise output of the engine cannot be optimized using current systems. Thus, there is a need for a method and device that improves upon the overall engine efficiency within a vehicle.

Thus, the primary object of the present invention is to provide an improved vehicle operating method that improves the fuel efficiency within a vehicle.

Yet another object of the present invention is to provide an improved method of operating a vehicle that reduces the noise level within the vehicle.

A further object of the present invention is to provide software modules that maximize the performance of a plurality of auxiliary devices within a vehicle.

These and other objects, features, or advantages of the present invention will become apparent from the specification and claims.

BRIEF SUMMARY OF THE INVENTION

A method and device for operating a vehicle. The vehicle has an engine management system that includes an engine that is controlled by a first software module. The first software module is in communication with a second software module. The second software module is in communication with a plurality of auxiliary devices that are manually operated by the engine and are in communication with both the first software module and the second software module. Thus, the first software module uses information gathered from the vehicle engine and the plurality of auxiliary devices to send torque and speed curve signals to the vehicle engine and additionally to send information to the second software module. Then, the second software module interacts with each individual auxiliary device to send signals to reduce the amount of power needed to an individual auxiliary device depending on the desired parameters of the vehicle such as the optimum noise level.

BRIEF DESCRIPTION OF THE DRAWINGS

FIG. 1 is a schematic diagram of an engine management system for a vehicle.

DETAILED DESCRIPTION OF THE PREFERRED EMBODIMENT

The FIGURE shows a schematic representation of an engine management system 10. The engine management system 10 comprises a vehicle engine 12 that is electrically connected and in communication with a first software module 14 that is also electrically connected and in communication with a second software module 16. Mechanically and electrically connected to the vehicle engine 12 and in communication with the second software module are a plurality of auxiliary devices 18. In a preferred embodiment, the first software module is an ECU (Electrical control unit) and is considered an engine management module. The engine management module determines the engine's speed versus torque characteristics and provides an input torque curve signal 20 to the engine 12. Additionally, the input torque curve signal 20 provides a choice of different torque curves wherein the vehicle engine 12 has the ability to change torque curves during operation.

The engine management module also is responsible for sending an input speed signal 22 to the engine 12 to provide the desired speed of the engine 12. In a preferred embodiment this desired speed is calculated by determining the total flow needed from the array of pumps driven by the engine 12 and sending a desired speed that is 10-15% above the actual need in order to provide the pumps with some margin of error. The desired speed is also controlled by the sum of all torque requirements on the engine 12 and based upon the engine's torque versus speed curve. The majority of the torque demands are hydraulic pumps. Other demands such as mechanical drives are also contemplated within the scope of this disclosure.

Other operations of the first software module 14 include avoiding engine speed adjustments such that surging occurs by having a parameter set delay in engine speed reductions. The first software module 14 also is able to handle reading a standard J1939 engine messages such as determining engine RPM, percentage of torque, and the like. Additionally, the first software module 14 has the ability to send feed forward adjustments to any speed critical functions when engine speed changes are made, again, to avoid surges.

The first software module 14 also receives a torque curve output signal 24 and an engine speed output signal 26 from the vehicle engine controller to make continuous calculations. Simultaneously, the vehicle engine 12 has a plurality of mechanical connections 28 to the auxiliary devices 18 to operate these devices such that the auxiliary devices 18 each produce speed and torque requirement signals 30 that are also sent to the first software module 14 for calculations. Upon making calculations based upon all the signals received, the first software module 14 sends an output signal 32 to the second software module 16 and the first software module 14 similarly receives an input signal 34 from the second software module 16. Thus, the second software module 16 is able to send a reduce power requirement signal 36 to the plurality of auxiliary devices 18 when the second software module 16 determines reduction of power within an individual auxiliary device 18 is needed.

The second software module 16, as with the first software module, in a preferred embodiment, is an ECU. Additionally, this ECU is considered the machine management module. Though the FIGURE presented only shows a second software module, a plurality of additional software modules can be utilized in order to account for a plurality of auxiliary functions. For example only, a single machine management module is provided in this disclosure.

The second software module 16 determines the total torque and flow demand based on a plurality of parameters in order to feed this information to the engine management block, or first software module 14. These plurality of parameters include parameters associated with the auxiliary devices such as hydrostatic pumps within the system. The parameters include maximum displacement of the pump, the pump speed, the flow demand (rate unlimited) from machine management, the percent input signal, and the measured pressure within each hydrostatic pump. Additional parameters can come from open circuit pumps that have similar parameters such as the maximum displacement, pump speed, flow demand (rate unlimited) from machine management, the percent input signal (flow input to each of the valves), and measured pressure. Additionally, parameters associated with mechanical torque demands can also be considered.

The hydrostatic pump displacement is known based on percentage command to that pump whereas the open circuit piston pump displacement is based on a percentage command to each flow control valve driven by the pump combined with the actual engine and pump speed. The torque demand by each pump is determined based upon the known displacement of the pump and a transducer measured pressure. Conversely, the flow demand needs of the functions driven by each pump also need to be known so that the engine speed is adjusted accordingly.

The second software module 16 additionally is used for the application of specific items, such as for example, control of each pump or proportional valve signal. Specifically, any PID or other speed or pressure control of these functions may be used. Adding priority levels to the various functions also may be beneficial and specifically to note which functions should be limited when power required by all functions is higher than the engine's capability. Consequently, the second software module 16 is able to determine when to send the reduced power requirement signal 36 to each individual auxiliary device 18 to ensure the higher priority devices are able to receive the needed power regardless of engine conditions.

In operation, the method of operating a vehicle using this engine management system 10 comprises providing a vehicle engine 12, first and second software modules 14 and 16 and a plurality of the auxiliary devices 18. The next step requires sending a speed and torque requirement signal 30 from the plurality of auxiliary devices 18 to the first software module 14. Then the vehicle engine 12 sends a torque curve output signal 24 and an engine speed output signal 26 to the first software module 14. Then the first software module 14 sends an output signal 32 to and receives an input signal 34 from the second software module 16.

Once the signals 24, 26, 30, and 34 are received by the first software module 14, the first software module 14 determines desired or optimum torque curves and desired or optimum engine speed to be used by the vehicle engine 12. Then the first software module 14 sends a torque curve signal 20 containing the measured torque curves and an engine speed output signal 26 to the vehicle engine 12. Simultaneously, the second software module 16 based on system parameters and the output signal 32 of the first software module 14 calculates a second torque curve and optimum engine speed and sends a reduction power requirement signal 36 to at least one of the plurality of auxiliary devices 18 to reduce the speed and torque requirement of the auxiliary device 18.

Thus, the engine management system 10 has a backup antistall such that if the actual engine speed falls below the target speed sent by the first software module 14 (engine management module) the first software module detects the inconsistency in the engine speed output signal 26. In response this information is passed along to the second software module 16 via output signal 32. The second software module 16 then controls the plurality of auxiliary devices 18. If the capability of the engine 12 has been exceeded, the second software module 16 sends a reduce power requirement signal 36 to a low priority high power auxiliary device 18 to prevent stalling. Thus, the second software module 16 is able to selectively send the reduced power requirement signal 36 to individual auxiliary devices 18 based upon a predetermined auxiliary device priority.

When determining the desired engine speed the first software module 14 monitors all of the auxiliary devices. In a preferred embodiment the plurality of auxiliary devices 18 includes a plurality of hydraulic pumps each having a required speed for operation. The first software module 14 in this embodiment calculates the desired engine speed based upon the pump requiring the highest speed. Similarly, the first software module 14 also monitors other auxiliary devices to determine which auxiliary device 18 requires the highest speed requirement. Then the first software module 14 uses this highest speed requirement to determine the minimum desired engine speed.

Additionally, both the first and second software modules 14, 16 have memories such that both keep historical data available regarding previous activities of the vehicle. Thus, if a vehicle has a common route or operation the first and second software modules 14, 16 are able to adapt the system by using the historical data to set priorities and protection against power surges. In this manner the software modules 14 and 16 are able to learn to prepare for certain conditions before they occur.

Thus, by using a plurality of software modules the engine management system 10 is able to compare a desired engine torque curve and an engine load demand that determines the engine speed. Additionally, the modules are able to be used to calculate the speed and torque requirement for each load of each auxiliary machine and engine requirement in order to determine the load and speed requirement imposed on the engine. The modules also calculate the torque and engine speed requirements to transmit into a signal to the vehicle engine 12.

The modules 14, 16 also are able to monitor the vehicle engine 12 and the loads associated with the auxiliary devices 18 to determine if the engine speed or torque curve needs to change as the vehicle is in operation. Therefore, the modules are able to transmit these new engine speeds and torques to the vehicle engine 12. When a module determines that the changed engine speed cannot accommodate all of the loads of the auxiliary devices 18 a reduced power requirement signal 36 can be sent to an auxiliary device based upon a predetermined priority.

The software modules 14 and 16 additionally are able to provide outputs to an operator to indicate the status of the machine. For example, the modules 14 and 16 are able to communicate to an operator when requested loads have exceeded the capability of the engine and have been reduced. The modules 14 and 16 also indicate which loads have been reduced. Additionally, the modules are able to indicate the engine speed when desired.

The modules 14 and 16 allow for loads such as hydraulic pumps that vary their outputs to be operated to ensure an optimum engine speed is attained. Additionally these changes are coordinated with the engine speed change to prevent surging and other undesirable actions. Additionally, the engine as described above, could be a plurality of engines as the modules described above could additionally be a plurality of modules.

Thus, disclosed is a method and engine management system 10 that provides for a plurality of software modules that are used to monitor machine conditions in order to determine the optimum engine operating speed and torque curves to produce the lowest fuel consumption while still maintaining all machine functions. Additionally, the software modules may be used to consider noise generation by the engine and other auxiliary device parameters to optimize conditions. Thus, a combined optimum fuel consumption and noise operation condition is achieved. The software accomplishes these optimum conditions by considering the speed and torque requirements of each individual auxiliary device. Additionally, the software modules are integrated with a machine control software and also capable of learning machine operating patterns and adjusting to machine conditions is provided. Thus, all of the stated objectives have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. A method of operating a vehicle, the steps comprising:
providing a plurality of auxiliary devices that receive a mechanical input from at least one vehicle engine to operate the plurality of auxiliary devices;
sending a speed and torque requirement signal from the plurality of auxiliary devices to a first software module;
sending a torque curve output signal and an engine speed output signal from the vehicle engine to the first software module;
determining an input torque curve signal within the first software module;
sending the input torque curve signal from the first software module to the vehicle engine; and
sending a reduced power requirement signal from a second software module to at least one of the plurality of auxiliary devices to reduce the speed and torque requirement of the auxiliary device such that higher priority auxiliary devices receive power from the engine regardless of engine conditions.

2. The method of claim 1 wherein the input torque curve signal is calculated based upon engine noise.

3. The method of claim 1 wherein the input torque curve signal is calculated using historical data.

4. The method of claim 1 wherein when the input torque curve signal comprises a plurality of torque curves each that can be selected by a control unit of the vehicle engine.

5. The method of claim 1 wherein the first software module calculates a desired engine speed and sends the engine speed output signal to the vehicle engine based upon the desired engine speed.

6. The method of claim 5 wherein the auxiliary machines include a plurality of pumps and the desired engine speed is determined by the pump requiring the highest speed.

7. The method of claim 5 wherein the desired engine speed is determined by the auxiliary machine requiring the highest speed.

8. The method of claim 5 wherein the second software module further calculates a second engine speed.

9. The method of claim 1 wherein the second software module selectively sends the reduced power requirement signal to individual auxiliary devices based upon a predetermined auxiliary device priority.

10. A engine management system for a vehicle comprising:
a vehicle engine;
a first software module electrically connected to and in communication with the vehicle engine;
a plurality of auxiliary devices mechanically connected to the vehicle engine and electrically connect and in communication with the first software module wherein the vehicle engine has a plurality of mechanical connections to the auxiliary devices to operate the plurality of auxiliary devices; and
a second software module electrically connected to and in communication with the first software module and in communication with the plurality of auxiliary devices such that a reduced power requirement signal is sent from the second software module to at least one of the plurality of auxiliary devices such that higher priority auxiliary devices receive power from the engine regardless of engine conditions.

11. The system of claim 10 wherein the first software module is an electric control unit.

12. The system of claim 10 wherein the second software module is an electric control unit.

13. The system of claim 10 wherein the second software module is selectively sends the signal to each individual auxiliary device.

14. The system of claim 13 wherein the second software module selectively sends the signal to the individual auxiliary devices based upon a predetermined auxiliary device priority.

15. The system of claim 10 wherein the second software sends a signal based upon historical data.

16. The system of claim 10 wherein at least one auxiliary device is a hydrostatic pump.

17. The system of claim 10 wherein at least on auxiliary device is a open circuit pump.

18. The system of claim 10 wherein the second software module comprises a plurality of software modules each in communication with at least on auxiliary device.

* * * * *